US010885797B2

(12) United States Patent
Brooks et al.

(10) Patent No.: US 10,885,797 B2
(45) Date of Patent: Jan. 5, 2021

(54) METHODS AND SYSTEMS FOR MANAGING DRONES WITH DRONE OPERATING PARAMETERS

(71) Applicant: INTERNATIONAL BUSINESS MACHINES CORPORATION, Armonk, NY (US)

(72) Inventors: Bradford O. Brooks, Longmont, CO (US); Grant D. Miller, Arvada, CO (US); Louis S. Sickenius, Longmont, CO (US); Srinivas B. Tummalapenta, Broomfield, CO (US); Robert D. Wilhelm, Cheyenne, WY (US); Hamza Yaswi, Erie, CO (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 151 days.

(21) Appl. No.: 15/488,934

(22) Filed: Apr. 17, 2017

(65) Prior Publication Data
US 2018/0299892 A1     Oct. 18, 2018

(51) Int. Cl.
*G08G 5/00*     (2006.01)
*B64C 39/02*    (2006.01)

(52) U.S. Cl.
CPC ......... *G08G 5/0091* (2013.01); *B64C 39/024* (2013.01); *G08G 5/006* (2013.01); *G08G 5/0013* (2013.01); *G08G 5/0026* (2013.01); *G08G 5/0034* (2013.01); *G08G 5/0043* (2013.01); *G08G 5/0069* (2013.01)

(58) Field of Classification Search
CPC .. G05D 1/0088; G05D 1/0027; G08G 5/0091; G08G 5/006; B64C 39/024
See application file for complete search history.

(56) References Cited

U.S. PATENT DOCUMENTS

| 8,115,665 B2 | 2/2012 | Zahavi | |
|---|---|---|---|
| 2009/0326792 A1* | 12/2009 | McGrath | G01W 1/08 701/120 |
| 2011/0118907 A1* | 5/2011 | Elkins | B64B 1/00 701/3 |
| 2014/0032034 A1* | 1/2014 | Raptopoulos | G08G 5/0069 701/25 |
| 2014/0142787 A1* | 5/2014 | Tillotson | G05D 1/101 701/3 |
| 2014/0277834 A1* | 9/2014 | Levien | B64C 39/024 701/2 |

(Continued)

OTHER PUBLICATIONS

Anonymous, "Crash controller for unmanned aerial vehicles," an IP.com Prior Art Database Technical Disclosure, IP.com No. IPCOM000239794D, Dec. 2, 2014 (4 pages).

(Continued)

*Primary Examiner* — Alan D Hutchinson
(74) *Attorney, Agent, or Firm* — Griffiths & Seaton PLLC (57) ABSTRACT

Embodiments for managing drones by one or more processors are described. A condition related to the operation of a drone in a selected area is detected. A set of drone operating parameters associated with the operation of the drone in the selected area is changed based on the detecting of the condition. A signal representative of the changing of the set of drone operating parameters is generated.

18 Claims, 7 Drawing Sheets

(56) References Cited

U.S. PATENT DOCUMENTS

| | | | | |
|---|---|---|---|---|
| 2014/0379173 | A1* | 12/2014 | Knapp | G06Q 10/10 |
| | | | | 701/2 |
| 2015/0234387 | A1* | 8/2015 | Mullan | G05D 1/104 |
| | | | | 701/3 |
| 2015/0248640 | A1* | 9/2015 | Srinivasan | G06Q 10/08355 |
| | | | | 705/338 |
| 2015/0336668 | A1* | 11/2015 | Pasko | B64C 39/024 |
| | | | | 701/2 |
| 2016/0111006 | A1* | 4/2016 | Srivastava | G08G 1/00 |
| | | | | 701/3 |
| 2016/0140851 | A1 | 5/2016 | Levy et al. | |
| 2016/0189549 | A1 | 6/2016 | Marcus | |
| 2017/0148328 | A1* | 5/2017 | Chan | G08G 5/006 |
| 2018/0165970 | A1* | 6/2018 | Namgoong | G05D 1/04 |
| 2018/0218619 | A1* | 8/2018 | Brown | G08G 5/0013 |
| 2019/0114925 | A1* | 4/2019 | Schulman | G06F 21/31 |

OTHER PUBLICATIONS

Anonymous, "Collision Avoidance for UAVs Using Simulated ADS-B Data," an IP.com Prior Art Database Technical Disclosure, IP.com No. IPCOM000241219D, Apr. 6, 2015 (3 pages).

Anonymous, "A Method and System for Managing a Fleet of Drones," an IP.com Prior Art Database Technical Disclosure, IP.com No. IPCOM000243855D, Oct. 22, 2015 (3 pages).

\* cited by examiner

METHODS AND SYSTEMS FOR MANAGING DRONES WITH DRONE OPERATING PARAMETERS

BACKGROUND OF THE INVENTION

Field of the Invention

The present invention relates in general to computing systems, and more particularly, to various embodiments for managing drones in or near regulated spaces.

Description of the Related Art

The use of drones, such as unmanned aerial vehicles (UAVs), has become increasingly prevalent in recent years. Besides recreational use, drones are now performing commercial and military tasks such as, for example, monitoring areas (e.g., for security purposes), searching areas for missing people and/or items, and visual productions (e.g., filming and photography). Additionally, it is expected that drones will be used to make deliveries in the near future (e.g., to deliver ordered products and/or items shipped from one location to another).

One of the problems associated with the use of drones for these tasks is that, for various reasons, it is sometimes undesirable for drones (e.g., UAVs) to operate in certain areas in a completely unrestricted manner, at least at certain times or under certain circumstances. Ideally, drones, such as UAVs, would be controlled and/or managed in such a way that when traveling in certain areas, their movements or capabilities are limited, or alternatively, less restricted, based on the current conditions in those areas.

SUMMARY OF THE INVENTION

Various embodiments for managing drones by one or more processors are described. In one embodiment, by way of example only, a method for managing drones, again by one or more processors, is provided. A condition related to the operation of a drone in a selected area is detected. A set of drone operating parameters associated with the operation of the drone in the selected area is changed based on the detecting of the condition. A signal representative of the changing of the set of drone operating parameters is generated.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As previously indicated, one of the problems associated with the use of drones for these tasks is that, for various reasons, it is sometimes undesirable for drones (e.g., UAVs) to operate in certain areas in a completely unrestricted manner, at least at certain times or under certain circumstances. At the same time, it is sometimes undesirable for drones to operate under previously mandated restrictions because of changes in the conditions related to the operation of the drones in particular areas.

Consider an example in which a UAV is scheduled to deliver an item (e.g., a product ordered through a website) to a delivery point (e.g., a residence). It may be foreseeable that under many circumstances, the delivery process may be carried out in a relatively simple, straightforward manner (e.g., dropping the item on a front porch of the residence) without any particular parameters or restrictions concerning the operation of the UAV during the delivery process (e.g., time of delivery, altitude during flight, exact drop off location, etc.). However, various conditions or circumstances may arise within an area surrounding the delivery point that may make the delivery more difficult or undesirable and/or suggest that it may be preferable that the UAV operate using particular parameters or restrictions during the delivery process.

For example, weather conditions may develop in the area, which make the delivery relatively high risk with respect to potential damage to the UAV or item during the delivery process (e.g., high winds) and/or damage to the item after being delivered at the delivery point (e.g., water damage from precipitation). As another example, the delivery point may be located within an area in which multiple other drones are operating, which may pose a potential threat of damage to the drones or the item(s) due to collisions. Further, if the delivery point happens to be in an area that is experiencing an unusual amount of ground traffic (e.g., from vehicles and/or pedestrians) around the time the delivery is to take place, there may be an increased threat of theft of the item after the delivery takes place (and/or the UAV itself during the delivery process). Particularly concerning is that such circumstances or conditions may arise only after the UAV has been scheduled to make the delivery, or even while the UAV is en route to the delivery point.

In view of the foregoing, a need exists for drone management methods and systems that, for example, modify the operational parameters of drones based on various conditions that are detected in the areas in which the drones are operating and/or in which the drones are scheduled or expected to operate.

For example, in some embodiments described herein, with respect to the delivery example described above, it may be desirable for the operational parameters used by the UAV to be modified when making the delivery (or otherwise traveling within the area). For instance, the altitude or speed at which the UAV travels when in the area of the delivery point may be modified, the exact drop off point may be changed (e.g., to a covered/sheltered location), or perhaps the delivery may be rescheduled for a later time or cancelled altogether (e.g., the UAV may not be granted permission to enter the area).

That is, the methods and systems of the present invention monitor various conditions related to (or associated with) the operation of drones (e.g., within particular areas) and modify the operational (or operating) parameters of the drones based on the detected conditions. As described above, the drone operating parameters may be modified to further restrict the manner in which the drone(s) operates in areas that previously have operational parameters in place. Alternatively, in some embodiments, drone operating parameters may be initiated in areas that previously did not have any such parameters mandated. However, it should be understood that the drone operating parameters may be modified such that the drone is permitted to operate with less restrictions than before (e.g., in situations/areas in which restrictions were previously mandated). In some embodiments, the monitoring of the conditions and the changing (or initiating) of the drone operating parameters is performed automatically. However, in some embodiments, appropriate personnel may manually perform one or more aspects of the functionality described herein.

In some embodiments, a method for managing drones by one or more processors is provided. A condition related to the operation of a drone in a selected area is detected. A set of drone operating parameters associated with the operation of the drone in the selected area is changed (or initiated) based on the detecting of the condition. A signal representative of the changing of the set of drone operating parameters is generated.

The drone may be controlled such that the drone operates in the selected area based on the changed set of operating parameters. In some embodiments, the drone is an unmanned aerial vehicle (UAV). However, it should be noted that the methods and systems described herein may (also) be used with ground based vehicles, such as unmanned ground vehicles (UGVs), and watercraft, such as unmanned surface vehicles (USVs).

The drone may be scheduled to operate in the selected area. The detecting of the condition related to the operation of the drone in the selected area may occur after the scheduling of the drone to operate in the selected area. The detecting of the condition related to the operation of the drone in the selected area may occur while the drone is traveling or within the selected area. As such, the detecting of the condition and/or the changing (or initiating) of the drone operating parameters may be performed in "real-time" or "dynamically" to optimize the overall performance and/or efficiency of the drone systems utilized in light of current conditions/recent developments in the areas of interest.

The set of drone operating parameters may include, for example, at least one of permission to enter the selected area, drone size, or drone speed. The condition related to the operation of the drone in a selected area may include, for example, at least one of a weather condition, terrestrial activity, or a security condition.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
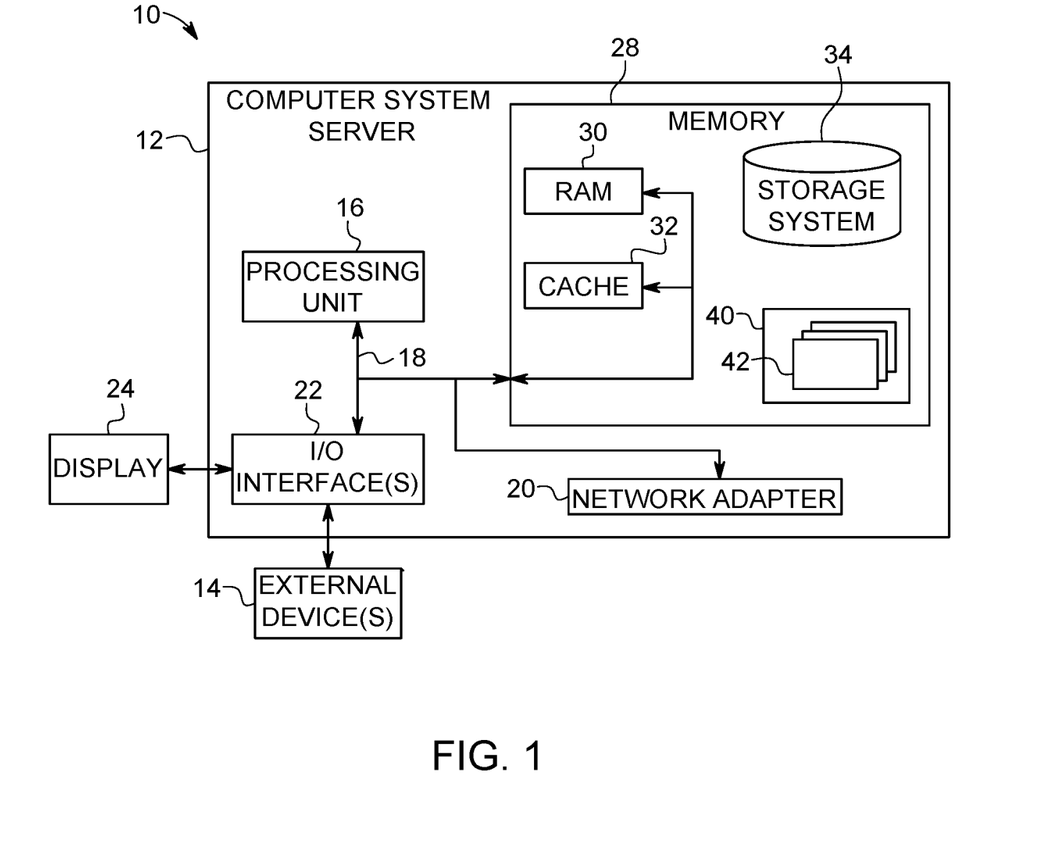
FIG. 1 is a block diagram depicting an exemplary computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors therein) is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, hand-held or laptop devices, and network PCs. However, in some embodiments, some of the components depicted in FIG. 1 may be located in a computing device in, for example, drones (e.g., UAVs) or computing systems that control drones and/or establish drone operating parameters (e.g., an aircraft control tower, military installation, etc). For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
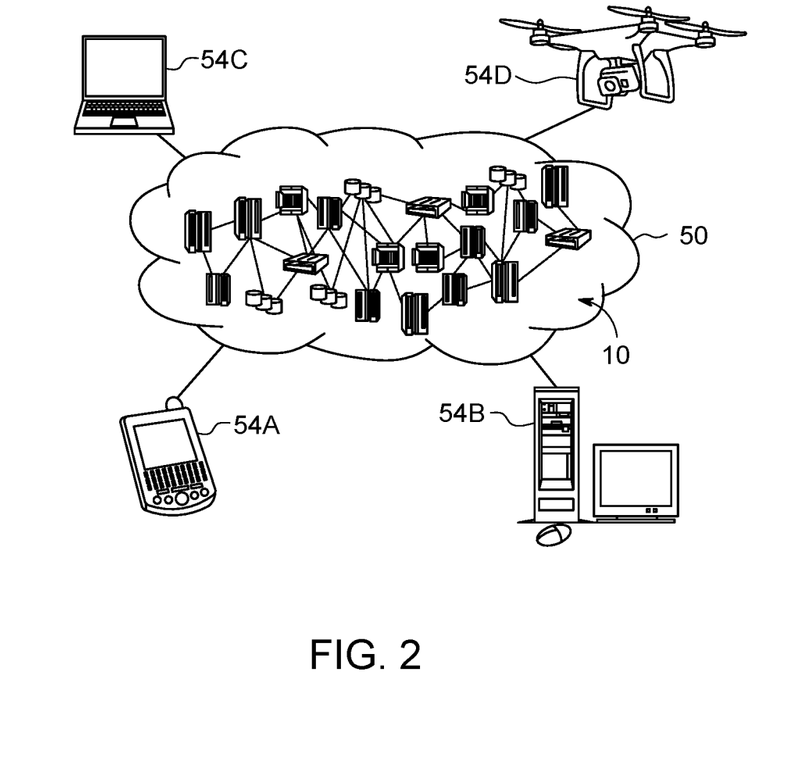
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and drone management computer systems, such as, for example, those in drones 54D (and/or drone control systems), may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-D shown in FIG. 2 are intended to be illustrative only and that computing nodes 10 and cloud computing environment 50 can communicate with any type of computerized device over any type of network and/or network addressable connection (e.g., using a web browser).

Figure 3:
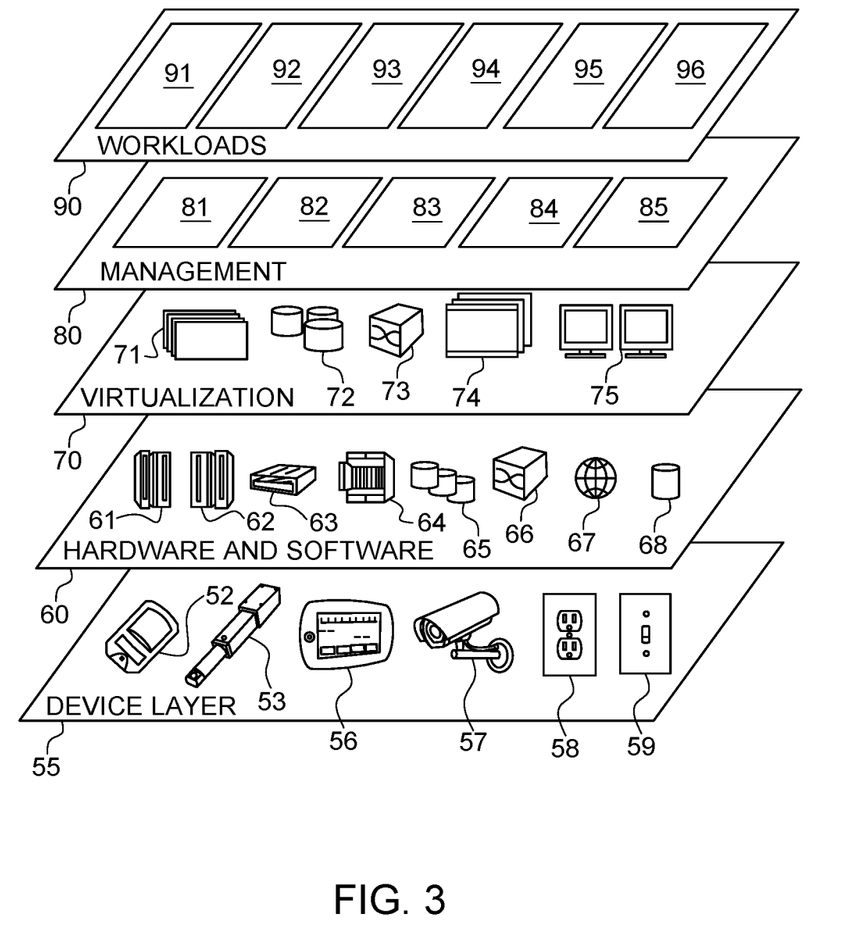
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to drones (e.g., UAVs), and various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing and controlling drones as described herein. One of ordinary skill in the art will appreciate that the workloads and functions 96 for managing and controlling drones may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the methods and systems of the illustrated embodiments provide novel approaches for managing drones, such as when traveling in, or near, areas in which drone operating parameters have been mandated (e.g., "regulated airspaces," "managed airspaces," "managed operational zones," etc.) or any area in which it is deemed desirable to mandate particular drone operating parameters for various reasons. The methods and systems may include a data collection aspect, where a variety of information may be collected about drones (e.g., ownership of the drone, destinations of the drone, and delivery points of the drones) and any regulated spaces in the general vicinity of the drones. Additionally, the information may include, for example, the current date/season and weather data (e.g., temperature, chance of participation, etc.) associated with the region(s) in which the drones are to travel. Further, the information may include any other information that is deemed to be related to or associated with the operation of drones in a particular area (e.g., air or ground activity, geopolitical circumstances, etc.). In some embodiments, the system(s) described herein control the drones in the manner(s) described below and/or otherwise enable or cause the various functionalities described to be performed.

Figure 4:
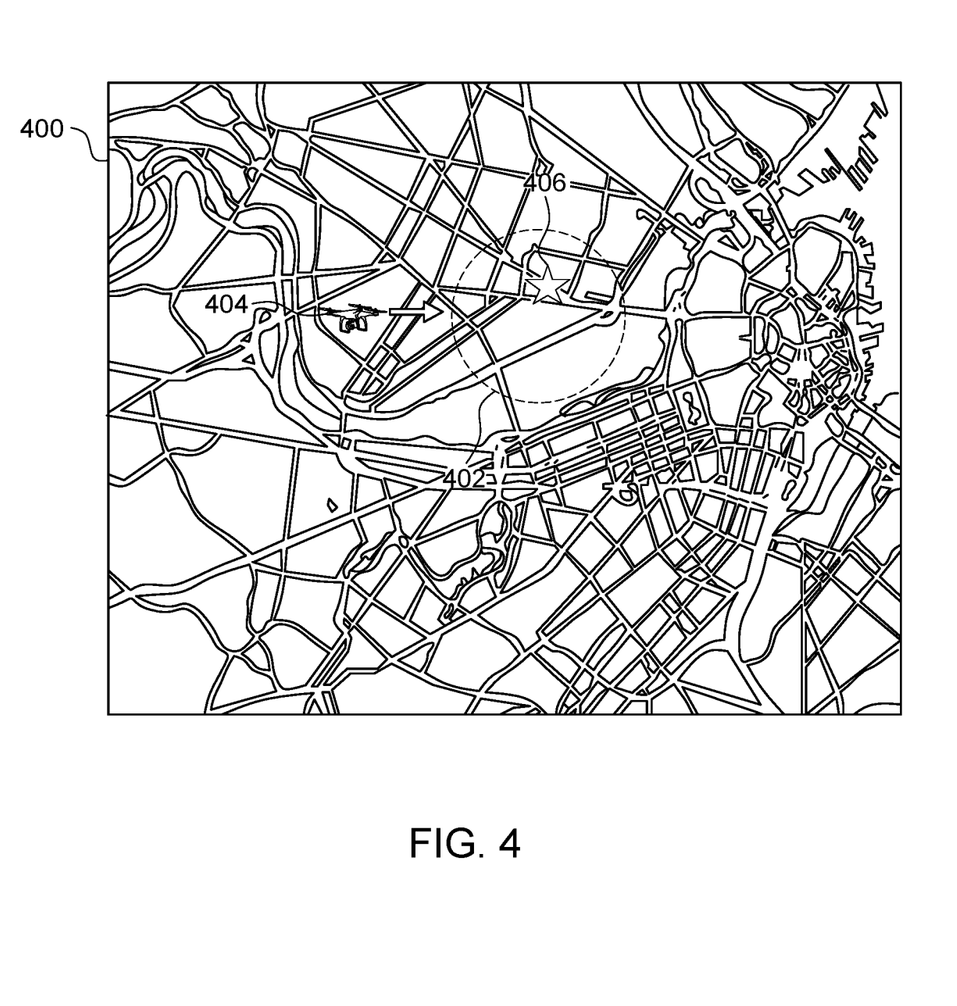
FIGS. 4 and 5 are plan views of a map illustrating various aspects of functionality in accordance with some embodiments of the present invention.

Referring to FIG. 4, a map 400 of a particular geographic region is shown. On the map 400, a particular area 402 is indicated. In some embodiments, area 402 corresponds to a previously defined (or established or mandated) managed operational zone that has an associated set of drone operating parameters. The drone operating parameters may include any type of regulations, rules, parameters, restrictions, instructions, etc. related to the use or operation of drones in area 402. For example, the drone operating parameters may be related to which particular drones or types/sizes of drones (e.g., UAVs, UGVs, etc.) are generally permitted to operate in area 402, the altitudes or speeds at which drones (e.g., UAVs) may operate, which paths (e.g., flight paths) and/or landing zones should be used, the types of drone functionality/equipment (e.g., cameras) or tasks (e.g., deliveries, recreational use, etc.) that may be implemented in area 402, the times at which certain drone activities may be performed, the types of payloads that are permitted, etc.

In such embodiments, the drone operating parameters may be defined or mandated, as well as monitored/controlled, by any suitable organization, such as government or military agencies, private businesses, residential groups (e.g., homeowners' associations), etc. For example, the managed operational zone may be associated with (e.g., defined around) airports, military installations, or particular portions of a city (e.g., neighborhoods in which the residents have decided they do not want drones traveling near their homes in an unrestricted manner).

In the particular embodiment shown, the area (or managed operational zone) 402 is essentially in the shape of a circle and may have any suitable size (e.g., a radius of, for example, between 100 meters and several kilometers). However, it should be understood that managed operational zones (and/or other areas in which drone operating parameters are implemented) may be in virtually any shape (e.g., rectangular, triangle, irregular polygons, etc.) and may be three dimensional. For example, the area 402 shown in FIG. 4 may be in the shape of a circular cylinder (that extends upwards from the ground) or a sphere. Also, the area (or managed operational zone) may only correspond to particular altitudes in the area in question and/or the size/shape of the zones may be different at different altitudes. In this regard, it should be noted that the managed operational zones may be applicable to drones on the ground (e.g., UAVs that have landed and/or are positioned on platforms or ground based drones, or other types of drones, such as UGVs and USVs). As will be appreciated by one skilled in the art, the size/shape of the area 402 (and/or the boundaries thereof) may be set/defined using the Global Positioning System (GPS) or any other suitable method. Further, it should be noted that multiple managed operational zones, with different drone operating parameters, may essentially overlap (e.g., one managed operational zone may be completely surrounded by a second, larger operational zone) and/or the managed operational zones may have different sections/portions.

However, it should be understood that in some embodiments, area 402 simply corresponds to any area (or zone) in which one or more drones is scheduled (or otherwise predicted) to operate, currently operating in, or traveling towards. In other words, in some examples, area 402 does not correspond to a previously defined managed operational zone with a set of drone operating parameters. Rather, area 402 may be a zone in which no previous/current drone operating parameters have been mandated. Further, it should be noted that a set of drone operating parameters may be associated with only particular drones, and perhaps only for particular tasks and/or at particular times.

Still referring to FIG. 4, a drone (e.g., UAV) 404 is shown as traveling towards area 402. As one exemplary task for which the drone 404 is being utilized, the drone 404 may be transporting an item to a delivery point (or destination) 406 that is located within area 402. However, it should be understood that the drone 404 may be utilized to perform any suitable task, such as monitoring/recording, recreational activity, etc., which may include the drone 404 simply passing through area 402. Additionally, although the drone 404 is shown as already traveling towards area 402, it should be understood that in some embodiments, some of the aspects of the present embodiments described herein are performed before the drone 404 is traveling towards area 402.

With respect to the delivery example referred to above, the delivery process may be mandated to be performed using a particular set of drone operating parameters, which may be associated with area 402 and/or the particular drone 404, perhaps for only this particular task. For example, the drone operating parameters may indicate an altitude and speed at which the drone 404 is to fly, particular flight paths, a particular drop off point for the delivery (e.g., a driveway of a residence), and an approximate time for the delivery.

In some embodiments, a condition (or change in conditions) related to (or associated with) the operation of drones (e.g., drone 404) in area 402 is then detected. As referred to above, it should be noted that in some examples, the condition may be detected while the drone 404 is in operation (e.g., has already been deployed and is traveling towards area 402 or is already within area 402). However, it should be understood that in some embodiments, the condition is detected before the drone 404 has been deployed, such as while the drone 404 is still stored (e.g., before or after the drone 404 has been scheduled to travel into area 402).

The condition related to the operation of the drone 404 may be, for example, any condition that may affect the operation of the drone, the ability for the desired task to be successfully completed, or the overall desirability for the drone 404 to be operated as was previously scheduled (i.e., before the condition was detected). Exemplary conditions may include, but are not limited to, weather conditions, traffic (e.g., air or ground), other drone activity in the area, emergencies (e.g., fires, seismic activity, etc.), changes in tolls/billing for the use of particular areas, geopolitical events, the availability of recharging stations, safety/security concerns/conditions, etc.

As one example, in the case in which the drone 404 is scheduled to deliver an item to the delivery point 406, a change in the weather conditions within area 402 may result in the previously established set of drone operating parameters within area 402 (if applicable) being deemed undesirable. For instance, if precipitation begins to fall or high winds are observed in area 402, the set of drone operating parameters previously mandated for area 402 (and/or drone 404 for this particular task) may no longer be optimal. For example, precipitation may cause damage to the drone 404 and/or the item being delivered, and high winds may increase the likelihood of the drone 404 not being able to successfully deliver the item.

It should be noted that the condition(s) related to the operation of the drone 404 may be detected in any suitable manner. For example, various types of information/sources may be used/monitored, including, but not limited to, weather reports, news reports, seismic activity, drone activity/scheduling, and audio/video devices (e.g., microphones and cameras on the drones and/or in appropriate locations, satellite images, etc.).

When such a condition (or change in conditions) is detected, the set of drone operating parameters associated with area 402 (and/or drone 404 while in area 402 and/or during the delivery of the item) may be changed in a suitable manner, based on the detected condition or change in conditions. Again referring to the example shown in FIG. 4, a change in the weather conditions may result in an appropriate change to the drone operating parameters associated with area 402 and/or drone 404 (or in situations in which no drone operating parameters were previously mandated, an appropriate set of drone operating parameters for area 402 and/or drone 404 may be initiated). For example, the altitude and/or speed at which the drone 404 travels in area 402 may be modified, the exact drop off point may be changed (e.g., to a secondary drop off point, such as a covered/sheltered location), and/or the delivery may be rescheduled for a later time or cancelled altogether (e.g., the drone 404 may not be granted permission to enter the area if the weather conditions are severe).

With respect to the delivery example referred to above, in some embodiments, a user (e.g., the recipient of the item) may be provided with an indication of exact drop off point (e.g., the original drop off point and/or the secondary drop off point), which may be provided in any suitable manner (e.g., electronic message, drone recorded video and photograph(s), voice recording describing the drop off point, through a web site, etc.). Before the delivery is made/completed, an indication of approval of the drop off point may be received from the user (e.g., via an electronic message, through a website, etc.).

After the set of drone operating parameters have been changed (or initiated), a signal (or indication) representative of the change in parameters is generated and/or provided in any suitable manner. For example, the (changed) drone operating parameters may be sent to and stored in a central database (e.g., accessible through a website) that is monitored by systems and/or personnel that control drones (e.g., businesses and/or private owners). As another example, alerts/updates related to drone operating parameters (and/or changes to drone operating parameters) may be sent to the appropriate drone systems/personnel in various manners, such as electronic messages (e.g., emails, text messages, etc.), phone calls (e.g., automated phone calls), etc.

The drone 404 may then be operated in a manner consistent with the current drone operating parameters (e.g., manually controlled by the individual owner/operator of the drone 404 and/or automatically controlled by a centralized control system). In some embodiments, if the drone 404 is detected (e.g., via GPS, cameras, human observation, or any other suitable means) as not operating in compliance with the set of drone operating parameters, an indication/message (e.g., an electronic message) may be sent to the owner/operator of the drone 404 and/or control of the drone 404 may be overridden such that the drone is forced to comply with the parameters, travels out of the managed operational zone, is disabled, etc.

Figure 5:
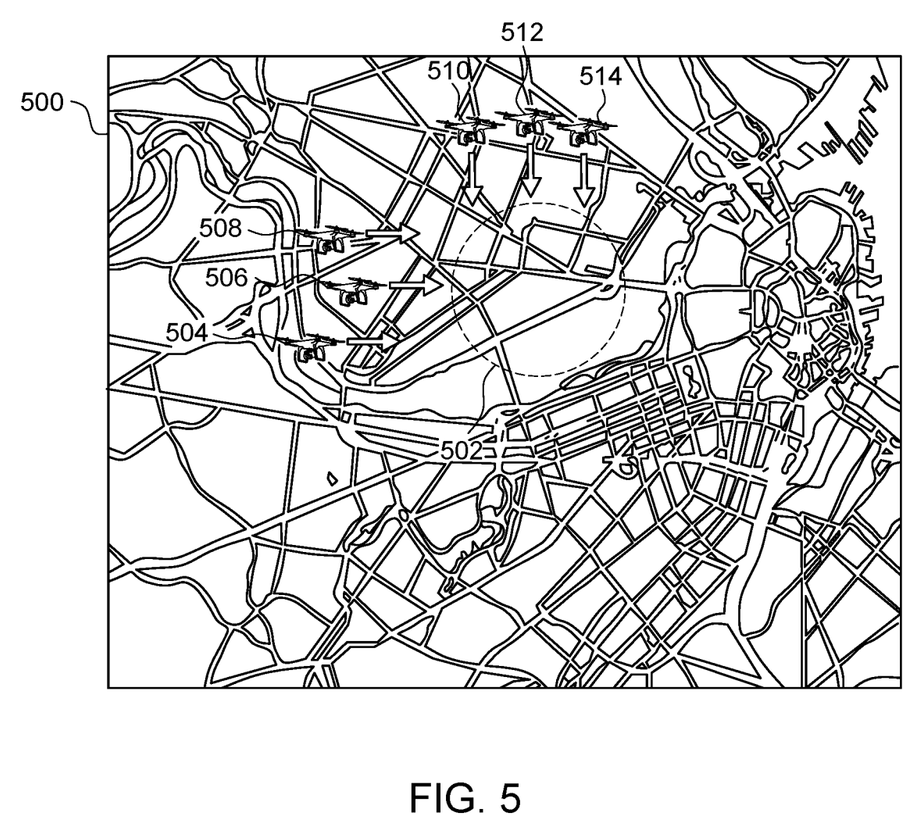

Referring now to FIG. 5, a map 500 of a particular geographic region, with a particular area 502 indicated, is shown (e.g., the same region and area shown in FIG. 4). As described above, the area 502 may correspond to a previously designated managed operational zone that has a (previously) associated set of drone operating parameters, or alternatively, the area 502 may correspond to an area that is scheduled to experience (or is already experiencing) drone activity.

Still referring to FIG. 5, drones (e.g., UAVs) 504-514 are shown as traveling towards area 502. In particular, drones 504, 506, and 508 are shown as traveling from left to right (e.g., from west to east) towards area 502, and drones 510, 512, and 514 are shown as traveling downwards (e.g., from north to south) towards area 502. As described above, although the drones 504-514 are shown as already moving towards area 502, it should be understood that the movements of the drones 504-514 indicated simply refer to predicted or scheduled movements of the drones 504-514 for any suitable task (e.g., making deliveries, etc.).

In such a situation, if all (or at least several) of the drones 504-514 are traveling through area 502 at the same time, or are scheduled/predicted to be traveling through area 502 at the same time, area 502 may experience relatively high drone traffic. Such a situation may be detected as a condition related to the operation of the drones 504-514 in area 502, as it may lead to an increase in the likelihood of, for example, the drones 504-514 colliding with each other. In response to such a condition, the set of drone operating parameters associated with area 502 may be changed (or if no drone operating parameters were previously mandated for area 502, a set of drone operating parameters may be initiated).

For example, in order to decrease the likelihood of collisions, different altitudes may be mandated for the different drones 504-514. As one example, the set of drone operating parameters may be changed so that the drones traveling in one direction through (or within) area 502 maintain a first altitude, and the drones traveling in a second direction through area 502 maintain a second altitude. In this particular example, one possible set of drone operating parameters may mandate that drones 504, 506, and 508, which are traveling from west to east, maintain a relatively low altitude while in area 502, while drones 510, 512, and 514, which are traveling from north to south, maintain a relatively high altitude while in area 502. Alternatively, the drone operating parameters may be changed (or set) to limit (e.g., reduce) the speed at which the drones 504-514 fly through area 502 to help prevent collisions (e.g., the reduced speed may improve the drones' automated ability to avoid one another).

Still referring to FIG. 5, as another example, the drone operating parameters may be changed (or set) such that the drones traveling in different directions do not fly through area 502 at the same time. For instance, the drone operating parameters may result in drones 510, 512, and 514 traveling through (or at least entering) area 502 after drones 504, 506, and 508 (e.g., drones 510, 512, and 514 may not be granted permission to enter area 502 until after drones 504, 506, and 508 have at least partially traversed area 502 and/or the operation of drones 510, 512, and 514 may be rescheduled).

As described above, after the drone operating parameters are changed (or set), a signal/indication of such is generated. The drones 504-514 may then be operated in a manner consistent with the current drone operating parameters (e.g., by the individual owners/operators of the drones and/or by a centralized control system). Further, if the drones 504-514 are detected as not operating in compliance with the set of drone operating parameters, an indication/message may be sent to the owner/operator of the drones 504-514 and/or control of the drones 504-514 may be overridden, as described above.

It should be understood that the changing of the drone operating parameters may not result in an increased number of restrictions being placed on the drones and/or the operation thereof. For example, a managed operational zone may initially have a drone operating parameter that requires drones (or the owners/operators thereof) to pay a toll (or fee) to enter and/or pass through the zone. If certain conditions are detected (e.g., a lack of drone activity in the zone), the drone operating parameters associated with the zone may be changed so that the toll is reduced and/or eliminated (e.g., at least for a certain period of time), which may result in an increased number of drones traveling through the zone. As another example, a managed operational zone may initially have a drone operating parameter that does not allow the use of video equipment (e.g., cameras) on the drones. However, if particular conditions are detected, such as a report of criminal activity in the area, the drone operating parameters may be changed to allow the use of video equipment to, for example, assist authorities (e.g., in locating potential suspects and/or providing information concerning the current state of the area).

Figure 6:
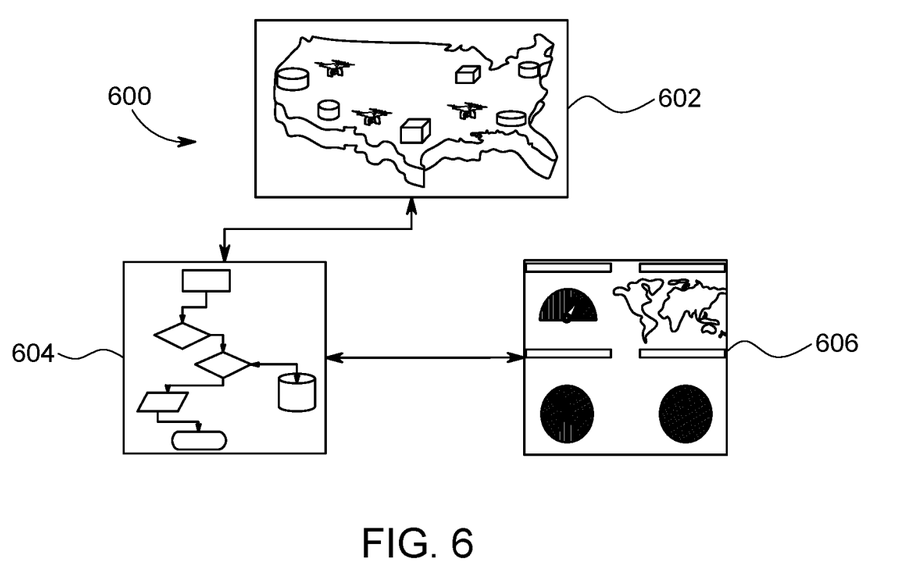
FIG. 6 is a simplified block diagram of a system for managing drones according to an embodiment of the present invention.

FIG. 6 is a simplified block diagram illustrating certain aspects of functionality, or a (computing) system 600 for managing drones, according to some embodiments of the present invention. The system 600 includes a managed operational zone grid 602, an analytics system 604, and a dashboard 606.

The managed operational zone grid 602 may include (and/or display) a map of the region(s) of interest (e.g., a country, state, county, city, etc.) along with previously established managed operational zones. The current locations of at least some drones operating in the region(s) may also be included and/or displayed.

The analytics system 604 may be configured to receive and/or detect the movement of drones and/or the predicted/scheduled movements of drones, as well as any conditions, events, situations, etc. that may be related to the operation of the drones in the region(s) of interest, perhaps the managed operational zones in particular. Although not specifically shown, in order to detect/receive such information, the analytics system 604 may be in operable communication with various data sources/systems, such as radar, video feeds, records of human observation, beacons/signals transmitted by drones (which may indicate the equipment/features with which the drone is equipped/are operational), GPS, news sources, weather forecasts/current conditions, emergency broadcast systems, satellite images, etc.

In some embodiments, the analytics system 604 is configured to utilize this information and determine, for example, whether or not any changes are to be made to the drone operating parameters associated with the managed operational zones, which changes are to be made to the drone operating parameters, and whether or not new managed operational zones should be created (i.e., in areas that previously did not have any drone operating parameters). Further, the analytics system 604 may be configured to automatically make any appropriate changes to the drone operating parameters and/or the managed operational zones and generate an appropriate signal/indication of those changes (as described above).

The dashboard 606 may provide a user and/or an automated system (e.g., the analytics system 604) with various information related to, for example, compliance with the drone operating parameters (i.e., whether or not drones are complying with the mandated/established drone operating parameters when in the managed operational zones). In some embodiments, when a drone is detected as not being in compliance, an indication of such may be provided to the owner/operator of the drone (e.g., via electronic message) and/or the control of the drone may be overridden such that the drone is forced to comply with the parameters, travels out of the managed operational zone, is disabled, etc.

Figure 7:
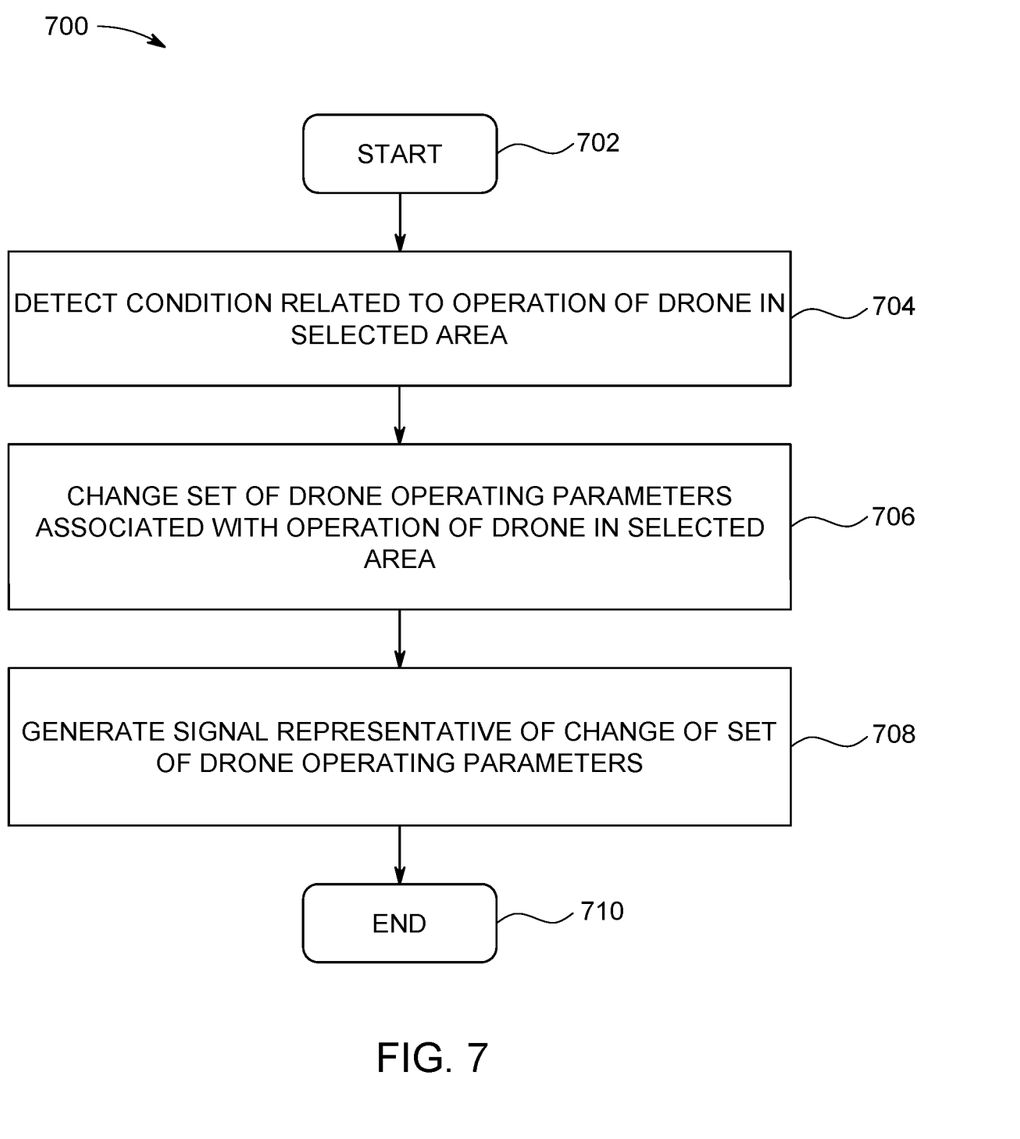
FIG. 7 is a flowchart diagram depicting an exemplary method for managing drones in which various aspects of the present invention may be implemented.

Turning to FIG. 7, a flowchart diagram of an exemplary method 700 for managing drones, in accordance with various aspects of the present invention, is illustrated. Method 700 begins (step 702) with, for example, a drone (e.g., UAV) being scheduled to travel to a particular area, such as a managed operational zone with an associated set of drone operating parameters, or alternatively, an area without any previously mandated drone operating parameters. In some embodiments, method 700 may being (step 702) with a drone traveling towards or within such an area.

A condition related to (or associated with) the operation of the drone in the area is then detected (step 704). As described above, the condition may be, for example, any condition that may affect the operation of the drone, the ability for the desired task to be successfully completed, or the overall desirability for the drone 404 to be operated as was previously scheduled (i.e., before the condition was detected). Exemplary conditions may include, but are not limited to, weather conditions, traffic (e.g., air or ground), other drone activity in the area, emergencies (e.g., fires, seismic activity, etc.), changes in tolls/billing for the use of particular areas, geopolitical events, the availability of recharging stations, safety/security concerns, etc.

A set of drone operating parameters associated with the operation of the drone in the area is then changed (step 706). For example, in an embodiment in which the area is a managed operational zone, the changed parameters may be previously established drone operating parameters associated with the area. In other embodiments, the change in the drone operating parameters may include the initiating of drone operating parameters within the area (e.g., the creation of a managed operational zone). The drone operating parameters may include any type of regulations, rules, parameters, restrictions, instructions, etc. related to the use or operation of drones in the area. For example, the drone operating parameters may be related to which particular drones (if any) are permitted to operate in area 402, the altitudes or speeds at which drones (e.g., UAVs) may operate, which paths (e.g., flight paths) should be used, the types of drone functionality/equipment (e.g., cameras) or tasks (e.g., deliveries, recreational use, etc.) that may be implemented in area 402, the times at which certain drone activities may be performed, etc.

A signal (or indication) representative of the change to the drone operating parameters is then generated (step 708). For example, the (changed) drone operating parameters may be sent to and stored in a central database (e.g., accessible through a website) that is monitored by systems and/or personnel that control drones (e.g., businesses and/or private owners). As another example, alerts/updates related to drone operating parameters (and/or changes to drone operating parameters) may be sent to the appropriate drone systems/ personnel in various manners, such as electronic messages (e.g., emails, text messages, etc.), phone calls (e.g., automated phone calls), etc.

Method 700 ends (step 710) with, for example, the drone being operated within the area in a manner in compliance with the (changed) set of drone operating parameters (e.g., by the owner/operator of the drone or a centralized control system). In the event that the drone is not operated in a manner that is compliant with the drone operating parameters, an indication of such may be provided to the owner/ operator of the drone (e.g., via electronic message) and/or the control of the drone may be overridden such that the drone is forced to comply with the parameters, travels out of the managed operational zone, is disabled, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for managing drones, comprising:
- receiving a set of drone operating parameters associated with an operation of a drone; wherein at least one of the drone operating parameters includes a drop off point for an item associated with a delivery task performed by the drone;
- detecting a condition related to the operation of the drone in a selected area; wherein the condition is detected prior to the drone entering the selected area and comprises a detected anomaly that would preclude the drone from completing the delivery task within the selected area;
- changing the set of drone operating parameters associated with the operation of the drone in the selected area based on the detecting of the condition; wherein the set of drone operating parameters further includes at least a permission to enter the selected area and a drone speed such that the permission to enter the selected area and the speed of the drone are dynamically modified in response to detecting the condition; and
- generating a signal representative of the changing of the set of drone operating parameters; wherein the signal includes a communicated message to a user querying an indication of approval to change the drop off point to an alternative drop off point that would enable the drone to complete the delivery task once in the selected area according to the changed set of drone operating parameters.

2. The method of claim 1, further including controlling the drone such that the drone operates in the selected area based on said changed set of operating parameters.

3. The method of claim 2, wherein the drone is an unmanned aerial vehicle (UAV).

4. The method of claim 1, further including scheduling the drone to operate in the selected area, wherein the detecting of the condition related to the operation of the drone in the selected area occurs after the scheduling the drone to operate in the selected area.

5. The method of claim 1, wherein the detecting of the condition related to the operation of the drone in the selected area occurs while the drone is traveling or within the selected area.

6. The method of claim 1, wherein the condition related to the operation of the drone in a selected area includes at least one of a weather condition, terrestrial activity, or a security condition.

7. A system for managing drones, comprising:
at least one processor that
- receives a set of drone operating parameters associated with an operation of a drone; wherein at least one of the drone operating parameters includes a drop off point for an item associated with a delivery task performed by the drone;
- detects a condition related to the operation of the drone in a selected area; wherein the condition is detected prior to the drone entering the selected area and comprises a detected anomaly that would preclude the drone from completing the delivery task within the selected area;
- changes the set of drone operating parameters associated with the operation of the drone in the selected area based on the detecting of the condition; wherein the set of drone operating parameters further includes at least a permission to enter the selected area and a drone speed such that the permission to enter the selected area and the speed of the drone are dynamically modified in response to detecting the condition; and
- generates a signal representative of the changing of the set of drone operating parameters; wherein the signal includes a communicated message to a user querying an indication of approval to change the drop off point to an alternative drop off point that would enable the drone to complete the delivery task once in the selected area according to the changed set of drone operating parameters.

8. The system of claim 7, wherein the at least one processor further controls the drone such that the drone operates in the selected area based on said changed set of operating parameters.

9. The system of claim 8, wherein the drone is an unmanned aerial vehicle (UAV).

10. The system of claim 7, wherein the at least one processor further schedules the drone to operate in the selected area, wherein the detecting of the condition related to the operation of the drone in the selected area occurs after the scheduling the drone to operate in the selected area.

11. The system of claim 7, wherein the detecting of the condition related to the operation of the drone in the selected area occurs while the drone is traveling or within the selected area.

12. The system of claim 7, wherein the condition related to the operation of the drone in a selected area includes at least one of a weather condition, terrestrial activity, or a security condition.

13. A computer program product for managing drones by one or more processors, the computer program product comprising a non-transitory computer-readable storage medium having computer-readable program code portions stored therein, the computer-readable program code portions comprising:
- an executable portion that receives a set of drone operating parameters associated with an operation of a drone; wherein at least one of the drone operating parameters includes a drop off point for an item associated with a delivery task performed by the drone;
- an executable portion that detects a condition related to the operation of the drone in a selected area; wherein the condition is detected prior to the drone entering the selected area and comprises a detected anomaly that would preclude the drone from completing the delivery task within the selected area;
- an executable portion that changes the set of drone operating parameters associated with the operation of the drone in the selected area based on the detecting of the condition; wherein the set of drone operating parameters further includes at least a permission to enter the selected area and a drone speed such that the permission to enter the selected area and the speed of the drone are dynamically modified in response to detecting the condition; and
- an executable portion that generates a signal representative of the changing of the set of drone operating parameters; wherein the signal includes a communicated message to a user querying an indication of approval to change the drop off point to an alternative drop off point that would enable the drone to complete the delivery task once in the selected area according to the changed set of drone operating parameters.

14. The computer program product of claim 13, wherein the at least one processor further controls the drone such that the drone operates in the selected area based on said changed set of operating parameters.

15. The computer program product of claim 14, wherein the drone is an unmanned aerial vehicle (UAV).

16. The computer program product of claim 13, wherein the computer-readable program portions further include an executable portion that schedules the drone to operate in the selected area, wherein the detecting of the condition related to the operation of the drone in the selected area occurs after the scheduling the drone to operate in the selected area.

17. The computer program product of claim 13, wherein the detecting of the condition related to the operation of the drone in the selected area occurs while the drone is traveling or within the selected area.

18. The computer program product of claim 13, wherein the condition related to the operation of the drone in a selected area includes at least one of a weather condition, terrestrial activity, or a security condition.

* * * * *